Figure 1:
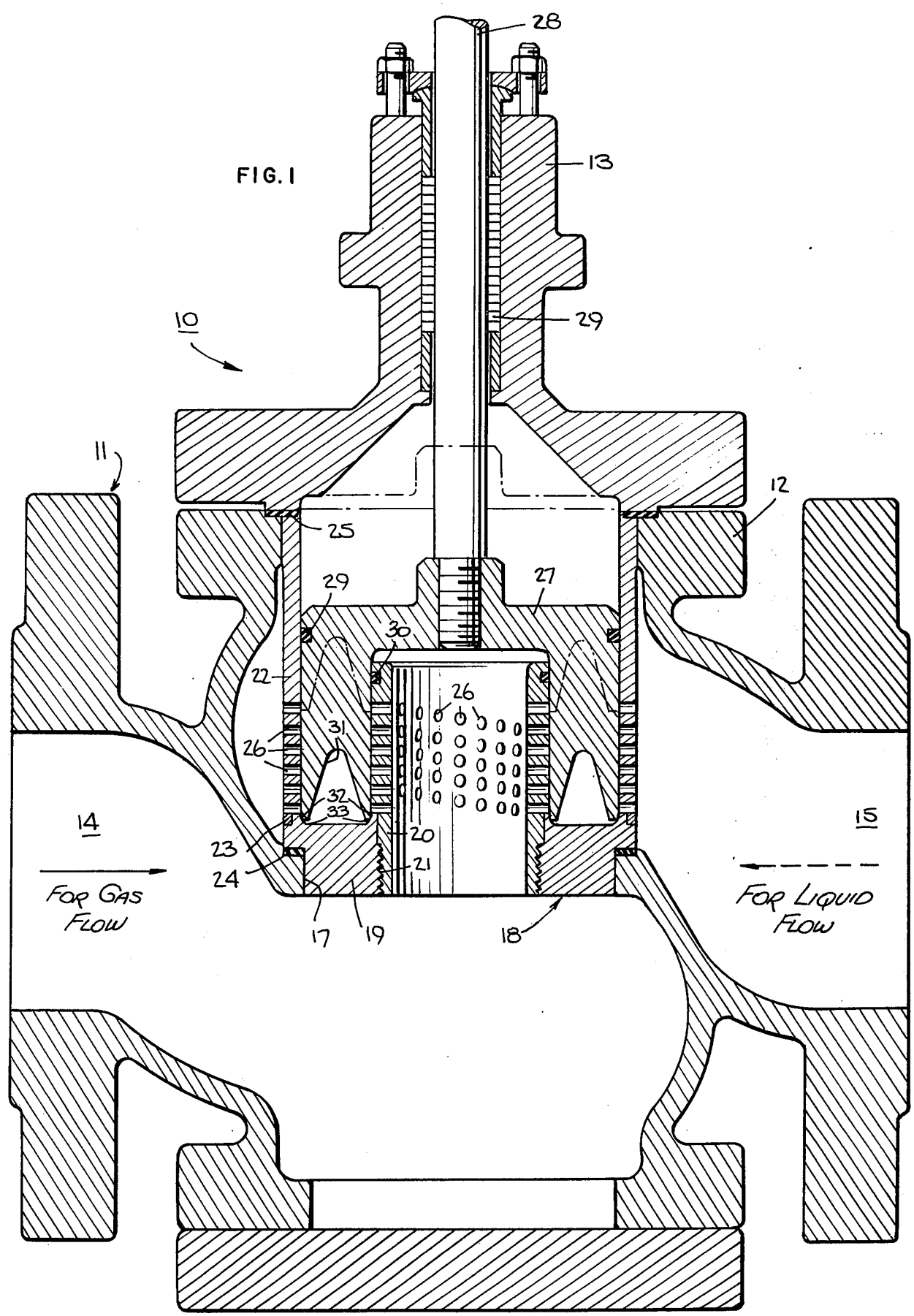

United States Patent [19]

Lindner

[11] 4,041,982
[45] Aug. 16, 1977

[54] DOUBLE WALL PLUG CONTROL VALVE

[75] Inventor: Henry Paul Lindner, Middletown, N.Y.

[73] Assignee: Kieley & Mueller, Inc., Middletown, N.Y.

[21] Appl. No.: 647,886

[22] Filed: Jan. 9, 1976

[51] Int. Cl.² ........................................... F16K 47/14
[52] U.S. Cl. .............................. 137/625.3; 137/625.37; 138/43
[58] Field of Search ........... 137/625.37, 625.3, 625.33, 137/625.39, 614.11; 251/127; 138/43

[56] References Cited

U.S. PATENT DOCUMENTS

| 833,672 | 10/1906 | Butler | 137/625.33 |
| 920,392 | 5/1909 | Rider | 138/43 X |
| 986,184 | 3/1911 | Lilly | 137/625.37 X |
| 1,108,500 | 8/1914 | Jamieson | 137/625.39 |
| 2,810,259 | 10/1957 | Burdett, Jr. | 137/625.37 X |
| 3,813,079 | 5/1974 | Baumann et al. | 137/625.37 X |

FOREIGN PATENT DOCUMENTS

| 137,226 | 1/1903 | Germany | 137/625.3 |
| 1,038,500 | 9/1958 | Germany | 137/625.37 |
| 45,189 | 9/1908 | Switzerland | 137/625.33 |
| 372,876 | 5/1932 | United Kingdom | 137/625.37 |

*Primary Examiner*—Arnold Rosenthal
*Attorney, Agent, or Firm*—Kenyon & Kenyon, Reilly, Carr & Chapin

[57] ABSTRACT

The control valve is provided with a double walled cage and a valve plug slidably mounted between the perforated walls of the cage. The control valve serves to reduce gas-generated noise when used for gas service and to control both cavitation and noise when used in liquid service.

10 Claims, 3 Drawing Figures

DOUBLE WALL PLUG CONTROL VALVE

This invention relates to a double wall plug valve. More particularly, this invention relates to a control valve constructed to reduce noise when used in gas service and both cavitation and noise when used in liquid service.

Heretofore, various attempts to reduce gas-generated noise in valves and to control both cavitation and noise in liquid service valves have been made. In some instances, use has been made of a double cage with a single wall plug placed inside the inner diameter of the inner cage. However, a disadvantage arises with this technique in that a double stage pressure reduction is only realized at near wide-open plug positions. At partial plug openings, the closed off first stage takes a large part of the total pressure drop with an insignificant amount being shared by the outer cage.

Various other types of double walled cages have also been used with plugs such as described in U.S. Pat. No. 2,643,254. Also, various types of structures which use throttling plates have been known for reducing flowing fluid pressure with low noise generation such as described in U.S. Pat. No. 3,665,965. It has also been known to construct double wall cages for use with a valve plug as described in U.S. Pat. No. 3,813,079 for purposes of establishing a resonant damping cavity between the two cage walls. Control valves have also been known which utilize a single perforated valve plug which is disposed within a recess of a valve seat as described in U.S. Pat. No. 1,108,500.

With all of the known structures, it has not been possible to effectively obtain a reduced noise level for a compressible flow, that is, a gas flow, and both noise reduction and reduced damage in liquid flow service by multiple stage drop throughout the entire stroke. As is known, in the case of a gas flow, a critical pressure ratio (i.e. the pressure drop across the cage divided by the upstream pressure) of greater than approximately 0.5 creates supersonic flow accompanied by normal and oblique shock waves that produce enormous sound levels. This is an exact similarity to the sound waves produced by a supersonic jet action; only the scale is different. In liquid service where cavitation exists, there is a critical pressure ratio or maximum pressure differential $\Delta P$ where maximum noise occurs in much the same manner as critical drop in gas flow. However, this ratio is not well fixed at around 0.5 as in gas flow but varies according to vapor pressure and internal geometry.

Accordingly, it is an object of the invention to provide a double walled control valve in which noise and damage are reduced by forcing a multiple stage pressure reduction for reduced noise in compressible flow and both noise reduction and reduced damage in liquid service.

It is another object of the invention to use a double walled plug and concentric cages to divide the total valve pressure drop into enough stages to retain subsonic flow and therefore achieve a large attenuation.

It is another object of the invention to provide a double walled control valve in which the double wall acts as a barrier to the transmission of the sound of general turbulence both in gas and liquid service.

It is another object of the invention to provide a control valve which is proportioned to obtain an optimum critical pressure ratio per stage for liquid service.

It is another object of the invention to provide a double walled plug control valve which allows less than critical pressure ratios per stage to be maintained through the full travel of the plug.

It is another object of the invention to provide two seats in series so that seat leakage depends on failure of both seats rather than only one as in a conventional valve.

Briefly, the invention provides a control valve having a housing which defines a flow path for a fluid flow and which includes a valve bridge which defines a restricted opening within the flow path. In addition, the control valve includes a cage which is mounted within the housing coaxially of the valve bridge opening and a valve plug which is movably mounted in the housing. The cage includes at least one pair of perforated concentric spaced apart walls located coaxially of the valve bridge opening while the valve plug is located in slidable relation at least between these walls to selectively open and close the perforations in these walls to a flow of fluid.

In one embodiment, the double walled cage includes a pair of perforated walls with the valve plug slidably mounted between these walls. The cage may be constructed to afford simple manufacture and assembly when made of multiple components. This also allows some flexibility in providing different constructions for different services, sizes and pressures.

The valve plug is provided with a recess at the terminal end along with two annular surfaces about the recess which mate with two surfaces on the interior of the cage to form two valve seats when the valve is closed. This ensures against leakage since both valve seats have to be unsealed before leakage can occur.

Figure 2:
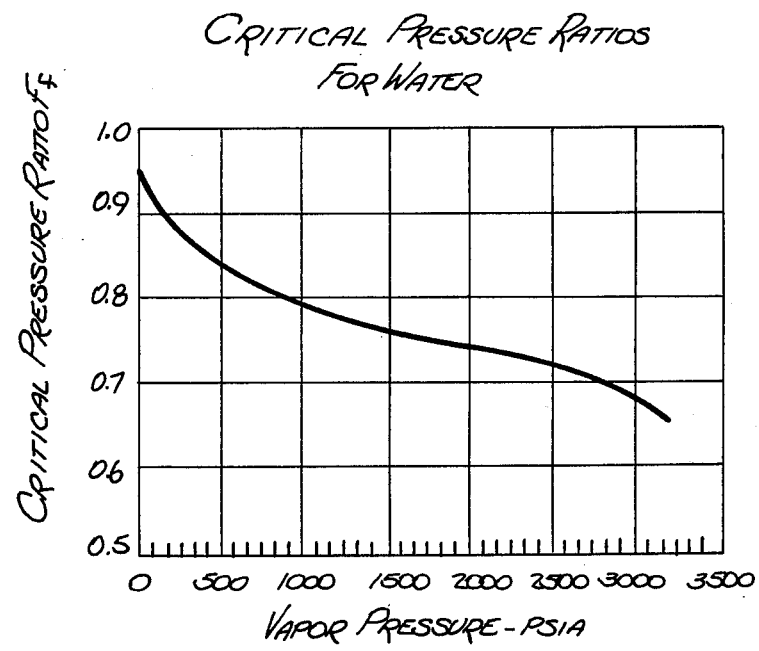

These and other objects and advantages of the invention will become more apparent from the following detailed description and appended claims taken in conjunction with the accompanying drawings in which:

FIG. 1 illustrates a cross-sectional view of a control valve employing a double wall plug with concentric cages according to the invention;

FIG. 2 graphically illustrates the critical pressure ratios for water; and

Figure 3:
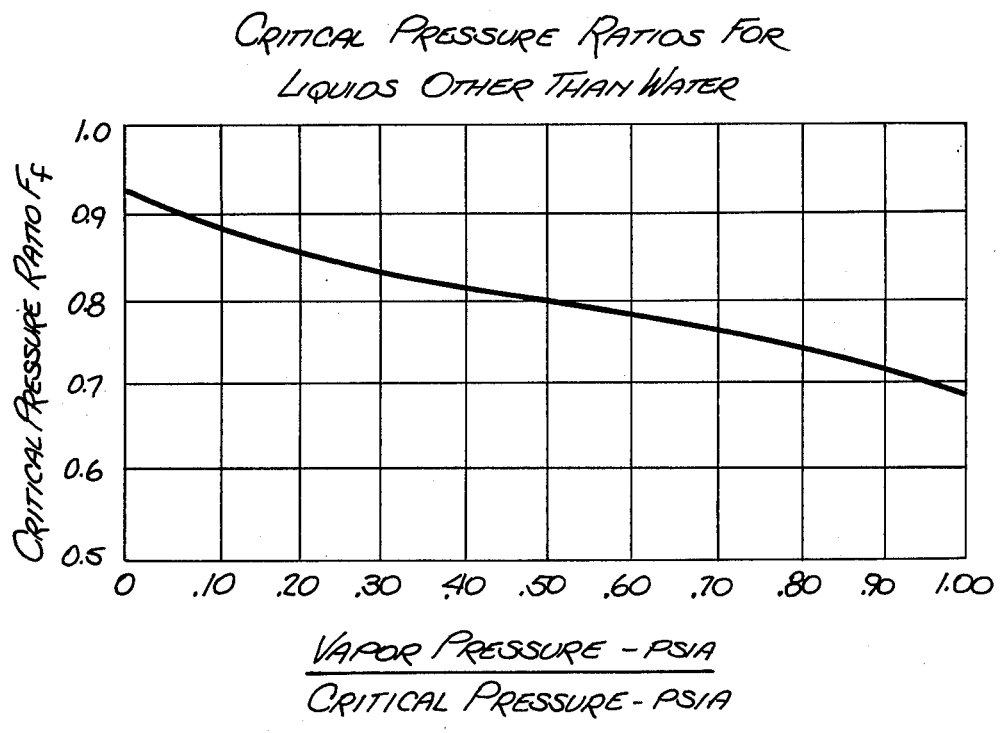

FIG. 3 graphically illustrates the critical pressure ratios for liquids other than water.

Referring to FIG. 1, the control valve 10 includes a body 11 of conventional structure and, to this end, the body 11 includes a flange 12 on which a bonnet 13 is removably mounted in sealed fashion. The body 11 includes an inlet 14 at one end for a flow of fluid and an outlet 15 at another end for the flow of fluid. In addition, the body 11 has a bridge opening 16 which defines a communicating opening 17 between the inlet 14 and outlet 15.

A double walled cage 18 is mounted within the body 11 on the valve bridge 16 coaxially of the bridge opening 17. This cage 18 includes an annular plate 19 which is mounted in the opening 17 of the valve bridge 16 in sealed relation as well as a first perforated cylinder 20 which is secured to the plate 19 such as by screwthreading 21 and a second perforated cylinder 22 which is mounted on the plate 19 in sealed relation. The two cylinders 20, 22 form perforated walls which are disposed in spaced apart concentric relation for passage of a fluid flow therethrough. As viewed, the outer cylinder 22 is fitted into a matching shouldered recess 23 of the annular plate 19 at the lower end and is abutted against the bonnet 13 of the valve 10 at the upper end.

Also, as shown, suitable seal gaskets 24, 25 are provided between the annular plate 19 and valve bridge 16 as well as between the outer cylinder 22 of the cage 18 and the bonnet 13. This latter seal 25 may also serve to seal the housing body 11 relative to the bonnet 13.

Each of the cylinders 20, 22 is provided with a plurality of perforations 26 formed in a spiral array or other manner. These perforations 26 may be of any suitable shape such as circular, square, rectangular or any geometric shape compatible with available manufacturing methods. The relative areas of perforations in the cylinders 20, 22 governs the ratio of pressure across the respective cages such that the critical ratio is not exceeded.

A valve plug 27 is movably mounted within the body 11 and is located in slidable relation between the two cylinders 20, 22 to control the fluid flow through the flow path from the inlet 14 to the outlet 15. To this end, the valve plug 27 is secured to a stem 28 which passes through the valve bonnet 13 in sealed relation and is secured to a suitable drive (not shown) for moving, e.g. by reciprocation, the valve plug 27 relative to the cage 18. As shown, a suitable packing 29 is provided in the bonnet 13 in order to provide a seal for the steam 28. The valve plug 27 is sealed with respect to the perforated cylinder 22 by means of an O-ring 29 or the like in an outer circumferential surface of the valve plug 27 which seals against the innermost surface of the cylinder 22 as well as by an O-ring 30 or other suitable seal in the innermost cylinder 20 which seals against the innermost circumferential surface of the valve plug 27.

As shown, the valve plug 27 is formed with an annular portion which slides within the space defined by the two concentric walls 20, 22 of the cage 18. In addition, an annular recess 31 is provided in the terminal surface of the plug 27 between the cylinders 20, 22 of the cage 18. This annular recess 31 may be of V-shaped, rectangular, circular or combination of these cross-sections to provide a void. The terminal surface of the valve plug 27 is also provided with two annular surfaces 32 to seal against mating surfaces 33 on the annular plate 19 when the valve plug 27 is moved into a closed position. When the valve is closed these form two sealing seats in series with each other such that both must fail before complete seal failure is experienced.

The stem 28 is actuated to move the valve plug between a first position (as viewed) in which the plug 27 sealingly engages against the annular plate 19 of the cage 18 to close the perforations 26 in the cylinders 20, 22 to a flow of fluid and a second position (fully open) in which the plug 27 is spaced from the annular plate 19 to open the perforations 26 in the cylinders 20, 22 to a flow of fluid.

When in operation for gas service, the gas flow passes through the inner cage wall 20 first whereas For liquid service, the flow of fluid passes through the outer cage wall 22 first. Thus, the inlet and outlet to the valve become reversed. In either case, when the valve 10 is closed, the valve plug 27 is seated on the annular plate 19 to close off the perforations 26 in the cylinders 20, 22. Upon opening, that is by moving the valve plug 27 away from the annular plate 19 via the stem 28 so as to expose perforations 26 in each of the cage walls 20, 22, the flow of gas or fluid passes sequentially through one cage wall into the space defined between the cage walls 20, 22 and thence through the second cage wall.

The double walled cage provides for a two-stage pressure reduction, or where more walls and cages are used, a multiple-stage pressure reduction. This provides reduced noise for a compressible gas flow and both noise reduction and reduced damage for liquid service.

As noted above, by using a double wall plug and concentric cages, the total valve pressure drop is divided into a sufficient number of stages so as to maintain the flow at subsonic rates in gas flow and non-cavitating rates in liquid flow. This, in turn, achieves a large attenuation. Thus, supersonic gas flow is avoided with the usual normal and oblique shock waves that would accompany such supersonic flow and liquid vaporization is avoided with the usual cavitation noise and damage. In addition, the double wall acts as a barrier to the transmission of the sound of general turbulence which would occur in gas or liquid service.

In either liquid or gas service, resonant conditions are ignored and only the critical pressure ratios are considered. The double wall plug 27 allows these optimum pressure ratios to be maintained throughout full travel rather than at only one position as in the case of other constructions.

It is to be noted that the use of the double wall plug 27 produces a restriction on both cage walls 20, 22 at all stroke positions. Furthermore, the space or void defined between the cage walls 20, 22 provides a large volume for conversion of velocity head to static head. The double wall containment of this void reduces noise transmission to the outside by acting as a barrier and sound absorber.

Experiments have shown that pressure ratio quantities across a given restriction to flow is the predominant factor in producing noise in gas service and in producing both noise and cavitation damage in liquid service. For liquid service where cavitation exists, there is a critical pressure ratio where maximum noise occurs in much the same manner as critical drop and gas flow. However, this ratio is not well fixed at around 0.5 as in gas flow but varies according to vapor pressure and internal geometry. Proper proportioning of the perforations 26 to the inner and outer cage walls 20, 22 which can be obtained by trial and error methods give optimum proportions of pressure ratios across both walls 20, 22 to minimize these effects throughout all stroke positions. For example, for gas, the ratio of pressure across each cage should be less than 0.5; for liquid, the pressure differential $\Delta p$ across each cage should be limited to $K_c (P_1 - F_f P_v)$ where $K_c$ is a constant determined from tests, $P_1$ is the absolute pressure upstream of either cage wall, $F_f$ is a liquid characteristic available from the graphs shown in FIGS. 2 and 3, and $P_v$ is the vapor pressure of the liquid. For purposes of illustration, the critical pressure ratios $F_f$ for water relative to vapor pressure are shown graphically in FIG. 2 and the critical pressure ratios of liquids other than water relative to the ratio of vapor pressure to critical pressure are shown in FIG. 3. The critical pressures of various fluids are as follows:

| | |
|---|---|
| AMMONIA | 1636 |
| BUTANE | 550.4 |
| CARBON DIOXIDE | 1071.6 |
| CARBON MONOXIDE | 507.5 |
| CHLORINE | 1118.7 |
| ETHYLENE | 735 |
| HELIUM | 33.2 |
| HYDROGEN | 188.2 |
| METHANE | 673.3 |
| NITROGEN | 492.4 |
| OXYGEN | 736.5 |
| PROPANE | 617.4 |

| | |
|---|---|
| -continued | |
| WATER | 3206.2 |

The spacing of the perforations in each cage can be distributed to give various characteristics, i.e. equal percent, linear or modified linear.

What is claimed is:

1. A control valve comprising
   a body defining a flow path for a fluid flow, said body including an inlet, an outlet and a valve bridge between said inlet and outlet defining a constricted opening within said path;
   a double wall cage mounted within said body coaxially of said valve bridge opening, said cage including a pair of perforated walls disposed in spaced apart concentric relation for passage of a fluid flow therethrough; and
   a valve plug reciprocally mounted in said body and located in slidable relation between said walls to control the fluid flow through said flow path from said inlet to said outlet.

2. A control valve as set forth in claim 1 wherein said walls and said valve plug are cylindrical.

3. A control valve as set forth in claim 1 wherein said valve plug includes an annular recess in a terminal surface located between said walls, a pair of annular surfaces about said recess and wherein said cage includes a pair of annular surfaces to mate with said surfaces on said plug to form valve seats when the valve is closed.

4. A control valve as set forth in claim 1 wherein each of said walls has a pattern of spirally arranged perforations.

5. A control valve as set forth in claim 1 wherein each of said walls has perforations of a size sufficient to obtain an optimum pressure ratio for minimum noise in liquid or gas service.

6. A control valve comprising
   a body defining a flow path for a fluid flow, said body including a valve bridge defining a constricted opening within said path;
   a cage mounted within said housing coaxially of said valve bridge opening, said cage including an annular plate mounted on said valve bridge within said opening in sealed relation, a first perforated cylinder secured to said plate and a second perforated cylinder mounted on said plate in sealed relation thereto and in spaced concentric relation to said first cylinder; and
   a valve plug movably mounted in said housing and located in slidable relation between said cylinders, said plug being movable between a first position in which said plug sealingly engages said annular plate to close the perforations in said cylinders to a flow of fluid and a second position in which said plug is spaced from said annular plate to open the perforations in said cylinders to a flow of fluid.

7. A control valve as set forth in claim 6 wherein said perforations in said cylinders are of a size proportioned to obtain an optimum pressure ratio for minimum noise in gas service for all positions of said plug between said first and second positions and to obtain optimum pressure ratio for minimum noise and damage in liquid service for all positions of said plug between said first and second positions.

8. A control valve as set forth in claim 6 wherein said plate includes a pair of annular surfaces thereon and said valve plug includes a recessed terminal portion having two annular surfaces to seal against said surfaces on said plate when the valve is in a closed position.

9. A control valve comprising
   a housing defining a flow path for a fluid flow, said housing including an inlet, an outlet and a valve bridge between said inlet and outlet defining a constricted opening with said path;
   a cage mounted within said housing on said valve bridge, said cage including at least one pair of perforated concentric spaced apart walls coaxially of said valve bridge opening; and
   a valve plug movably mounted in said housing and located in slidable relation at least between said walls to selectively open and close the perforations in said walls to control a flow of fluid through said flow path from said inlet to said outlet.

10. A control valve comprising
    a body defining a flow path for a fluid flow, said body including a valve bridge defining a constricted opening within said path;
    a double wall cage mounted within said body coaxially of said valve bridge opening, said cage including a pair of perforated walls disposed in spaced apart concentric relation for passage of a fluid flow therethough and a pair of annular surfaces; and
    a valve plug reciprocally mounted in said body and located in slidable relation between said walls, said valve plug including an annular recess in a terminal surface located between said walls and a pair of annular surfaces about said recess to mate with said surfaces of said cage to form valve seats when the valve is closed.

* * * * *